US006751986B2

(12) United States Patent
Irwin et al.

(10) Patent No.: US 6,751,986 B2
(45) Date of Patent: *Jun. 22, 2004

(54) STRUCTURED PACKING

(75) Inventors: Nancy Christine Irwin, Summit, NJ (US); Ramachandran Krishnamurthy, Chestnut Ridge, NY (US); Kevin McKeigue, Berkeley Heights, NJ (US)

(73) Assignee: The BOG Group, Inc., Murray Hill, NY (US)

( * ) Notice: Subject to any disclaimer, the term of this patent is extended or adjusted under 35 U.S.C. 154(b) by 147 days.

This patent is subject to a terminal disclaimer.

(21) Appl. No.: 10/016,469

(22) Filed: Dec. 10, 2001

(65) Prior Publication Data

US 2002/0142130 A1 Oct. 3, 2002

Related U.S. Application Data

(60) Provisional application No. 60/257,442, filed on Dec. 22, 2000.

(51) Int. Cl.[7] .............................. F25J 1/00; B32B 3/10; B32B 3/28; B01D 47/00
(52) U.S. Cl. ........................ 62/643; 428/137; 428/184; 261/105; 62/906
(58) Field of Search ................ 62/906, 643; 261/112.2, 261/105; 428/182, 184, 137

(56) References Cited

U.S. PATENT DOCUMENTS

| | | | |
|---|---|---|---|
| 4,186,159 A | 1/1980 | Huber ........................ 261/112 |
| 4,597,916 A | 7/1986 | Chen .......................... 261/94 |
| 4,623,454 A | 11/1986 | Tauscher et al. ............ 210/150 |
| 4,871,382 A | 10/1989 | Thorogood et al. ............ 62/18 |
| 5,028,356 A | 7/1991 | Wiltz ......................... 261/109 |
| 5,188,773 A | * 2/1993 | Chen et al. ............... 261/112.2 |
| 5,350,566 A | 9/1994 | Stringaro .................... 442/109 |
| 5,407,607 A | * 4/1995 | Mix .......................... 261/112.2 |
| 5,474,832 A | 12/1995 | Massey ...................... 428/182 |
| 5,498,376 A | 3/1996 | St. Louis et al. ............ 261/113 |
| 5,632,934 A | 5/1997 | Billingham et al. ....... 261/112.2 |
| 5,921,109 A | 7/1999 | Billingham et al. .......... 62/643 |
| 6,000,685 A | 12/1999 | Groten et al. ............ 261/112.2 |
| 6,280,819 B1 | 8/2001 | McKeigue et al. ......... 428/137 |
| 6,509,082 B1 | * 1/2003 | Mc Keigue et al. ........ 428/137 |

FOREIGN PATENT DOCUMENTS

| | | | |
|---|---|---|---|
| EP | 0 036 944 | 10/1981 | |
| EP | 0 151 693 A1 | 8/1985 | ........... B01D/53/18 |
| EP | CH 662 515 A5 | 10/1987 | ............. B01D/3/24 |
| EP | 0 858 366 B1 | 7/2000 | ............. B01J/19/32 |
| EP | 1 063 009 A1 | 12/2000 | ............. B01J/19/32 |
| EP | 166 868 A2 | 1/2002 | ............. B01J/19/32 |
| WO | WO 97/16247 | 5/1997 | ............. B01J/19/32 |

OTHER PUBLICATIONS

Z. Olujic, "Stretching the Capacity of Structured Packing," American Institurte of Chemical Engineers (AICHE), Nov. 14, 2000 Annual Meeting, Los Angeles California.

Spiegel et al., "Structured Packings Today and Tomorrow," Structured Packings Today and Tomorrow, AICHE Spring Meeting Mar. 5–9, 2000, Atlanta, GA.

Z.Olujic, "Structured Packings: An Overview", Conference Presentations at AICHE Annual Meeting, Los Angeles, Nov. 16–21, 1997.

* cited by examiner

Primary Examiner—William C. Doerrler
(74) Attorney, Agent, or Firm—Philip H. Von Neida

(57) ABSTRACT

A structured packing element comprises a plurality of corrugated sheets and one planar member positioned adjacent to each of the corrugated sheets. The planar member has a top edge and a bottom edge that are at least proximally aligned with the top and bottom edges respectively of the corrugated sheets. The planar member is further characterized by a middle portion having an open area percent that is higher than the open area percents of the top and bottom portions of the planar member. The structured packing element can be used to form structured packings for distillation applications.

19 Claims, 6 Drawing Sheets

STRUCTURED PACKING

CROSS REFERENCE TO RELATED APPLICATIONS

The present application claims priority to U.S. Provisional Application S/No. 60/257,442, filed on Dec. 22, 2000.

FIELD OF THE INVENTION

The present invention relates generally to structured packings, and more particularly, to structured packing elements and applications to cryogenic distillation.

BACKGROUND OF THE INVENTION

Structured packings have found widespread use in a variety of distillations including those involved in the separation of air into its component parts. Distillations are conducted within distillation columns filled with mass transfer elements to bring ascending vapor phases into intimate contact with descending liquid phases of mixtures to be separated. As the ascending phase rises and contacts the descending liquid phase, it becomes evermore enriched in the more volatile components of the mixture to be separated. At the same time, the descending liquid phase becomes ever more concentrated in the less volatile components of the mixture to be separated. In such fashion, systems of distillation columns can be used to separate various mixture components. For instance, in case of air separation, nitrogen is often separated from oxygen in a double distillation column unit, in which the descending liquid phase becomes ever more concentrated in oxygen and the ascending gaseous phase becomes ever more concentrated in nitrogen. Argon is then separated from oxygen in an argon column that is attached to a lower pressure column of such a double distillation column unit.

Structured packings are widely used as mass transfer elements within distillation columns due to their low pressure drop characteristics. Structured packings generally include a series of structured packing elements that are made up of a number of corrugated sheets of material, in which the sheets are placed in a side by side relationship with the corrugations of adjacent sheets criss-crossing one another. In use, the liquid phase of the mixture to be separated is distributed to the top of the packing and spreads out throughout the packing as a descending film. The vapor phase of such a mixture rises through the corrugations contacting the liquid film as it descends. The use of structured packings in distillation columns for air separation is well-known in the art, and a more detailed discussion can be found, for example, in U.S. Pat. No. 6,280,819, entitled "Structured Packing".

The performance of a structured packing is characterized primarily by its separation efficiency, or the height of packing equal to a theoretical plate (HETP), its operational pressure drop, and its capacity. Packings with high capacity and high separation efficiency (low HETP) are desirable because they lead to reduced equipment sizes and lower capital costs in commercial plants. Packings with low operational pressure drops are desirable because they lead to reduced power requirements and thus lower operating costs. Since the performance characteristics of structured packings have such a great influence on the economics of distillation-based commercial processes, there are many examples of packings that have been designed in an attempt to achieve an optimal balance between separation efficiency, pressure drop and capacity for a given process.

SUMMARY OF THE INVENTION

The present invention provides generally a structured packing element comprising a plurality of perforated corrugated sheets and a planar member positioned adjacent to each of the corrugated sheets. The planar member has a top and bottom portion each having an open area percent that is less than that of a middle portion. Furthermore, the outermost edges of the top and bottom portions are at least proximally aligned with respect to the top and bottom edges respectively of the perforated corrugated sheets. In one embodiment, the open area percents of the top and bottom portions are each less than about 20%, the open area percent of the middle portion is at least about 50% and less than 100%, and the heights of the top and bottom portions are each at least about two times the corrugation width of the corrugations in the corrugated sheets, but not greater than about one-third of the height of the corrugated sheets.

Another aspect of the present invention provides for a structured packing comprising a plurality of these structured packing elements, in which the open area percents of the top and bottom portions of the planar member are each less than the open area percent of the middle portion, and the outermost edges of the top and bottom portions are at least proximally aligned with the top and bottom edges of the corrugated sheets. Structured packings can be fabricated from the packing elements of this invention with reduced costs and enhanced quality, and such packings further provide improved capacity compared to conventional packings. These structured packings can be used in distillation columns for a variety of applications, including cryogenic distillations such as air separation.

Thus, another aspect of the present invention provides for a method of cryogenic separation of a fluid mixture in a distillation column, in which at least one section of the distillation column contains a structured packing that comprises structured packing elements having a planar member adjacent to each of the corrugated sheets, where the planar member has a middle portion having an open area percent that is more than those of the top and bottom portions of the planar member, and the planar member has outermost edges that are aligned with the top and bottom edges respectively of the corrugated sheets.

BRIEF DESCRIPTION OF THE DRAWINGS

While the specification concludes with claims distinctly pointing out the subject matter that the applicants regard as their invention, it is believed the invention would be better understood when taken in connection with the accompanying drawings in which:

FIG. 1b is a schematic side elevational view of the structured packing element of FIG. 1a;

DETAILED DESCRIPTION

It has been found that structured packings comprised of corrugated sheets with planar members alternating with and located between the corrugated sheets provide improved performance characteristics in certain applications. This type of structured packings has been disclosed, for example, in U.S. Pat. No. 6,280,819, entitled "Structured Packing". In air separation processes, structured packings having full size planar members (i.e., with heights and widths about equal to those of the corrugated sheets) provide increased capacity compared to conventional packings formed from corrugated sheets alone. However, if the full size planar member is replaced by two relatively short planar members, which are aligned such that a lowermost edge of one planar member is proximal to a lowermost edge of the corrugated sheet and an uppermost edge of the other planar member is proximal to an uppermost edge of the corrugated sheet, the resulting structured packing provides an improved separation efficiency compared to the configuration with the full size planar member, while retaining the improved capacity advantage.

Figure 1A:
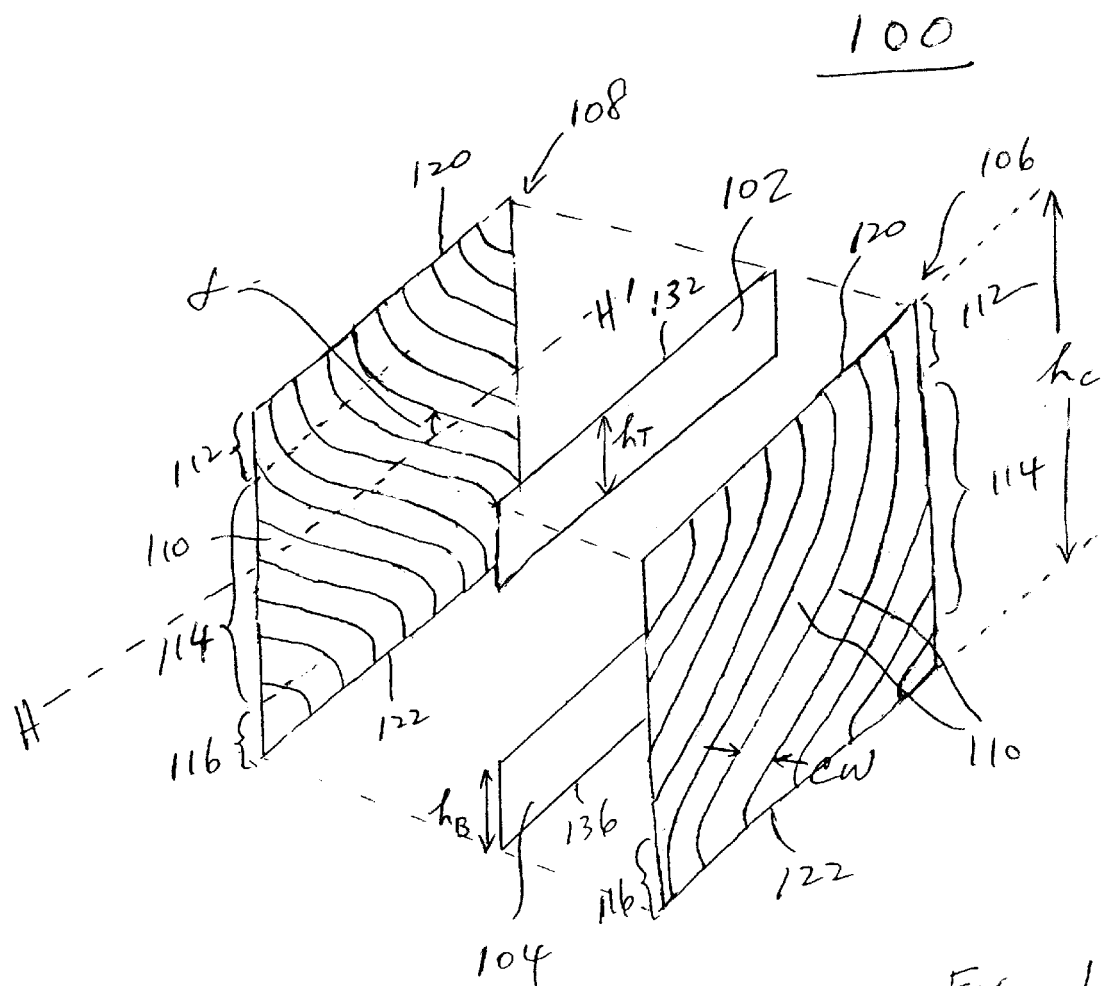
FIG. 1a is a schematic exploded view of a portion of a structured packing element.
Figure 1B:
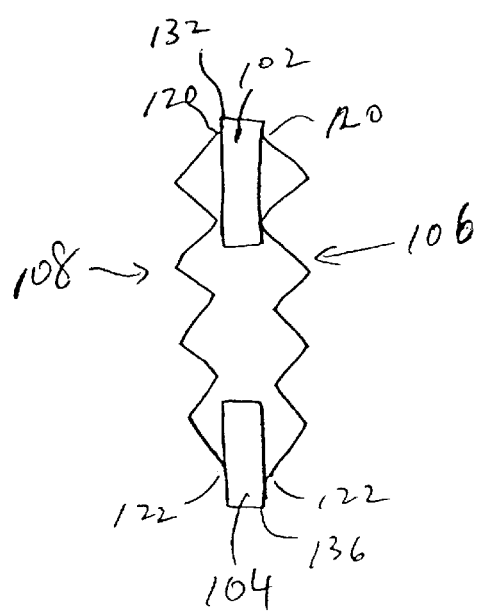

FIG. 1a is a partial exploded view and FIG. 1b is a side view of a portion of a structured packing element 100 that has been described in copending U.S. patent application Ser. No. 09/746,094, entitled "Structured Packing". The structured packing element 100 comprises pairs of planar members 102 and 104 located between corrugated sheets 106 and 108, resulting in an array of corrugated sheets alternating with pairs of planar members. Corrugated sheets 106 and 108 have corrugations 110 that extend from an upper portion 112 through a middle portion 114 to a lower portion 116. For each of the corrugations 110, a corrugation width, CW, can be defined as a distance from peak to peak, or trough to trough, measured perpendicularly to the longitudinal axis of the corrugation.

Figure 1C:
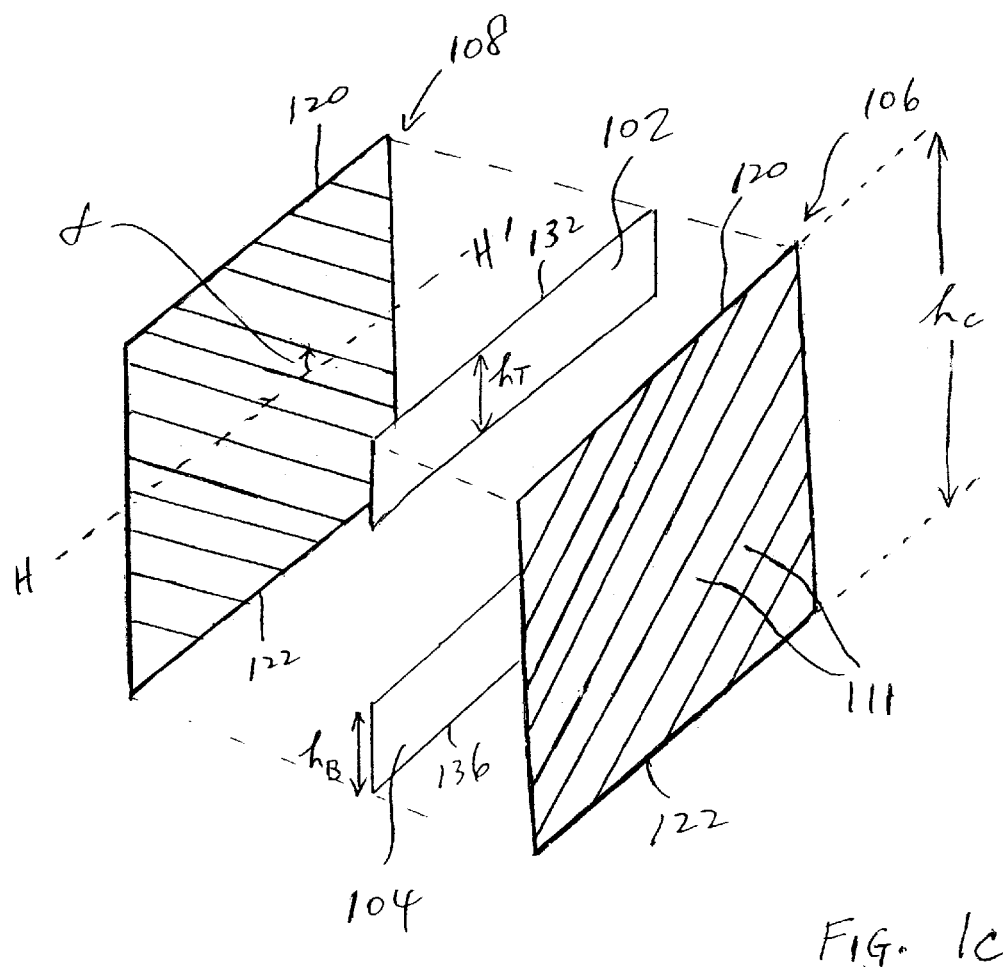
FIG. 1c is a schematic exploded view of a portion of a structured packing element containing corrugated sheets with linear corrugations.

As shown in FIG. 1a, the corrugations 110 are further characterized by an angle of inclination $\alpha$ with respect to a horizontal direction HH' that varies between the middle portion 114 and the upper and lower portions 112, 116. This type of corrugated sheets, i.e., having a variable angle of inclination $\alpha$, is used in one version of a MELLAPAK-PLUS™ packing that is available from Sulzer Chemtech Ltd., Winterthur, Switzerland, details of which are disclosed in a PCT International Patent Application WO 97/16247. However, many other types of corrugated sheets, e.g., those with a constant angle of inclination, or other designs whether commercially available or not, can also be used in conjunction with the planar members 102 and 104 to form structured packing elements similar to that illustrated in FIGS. 1a–b. A structured packing element containing corrugated sheets 106, 108 with linear corrugations 111—i.e., having constant angles of inclination $\alpha$, is shown in FIG. 1c. This type of corrugated sheet, for example, is used in the MELLAPAK™ packing available from Sulzer Chemtech.

FIGS. 1a–c show a preferred alignment configuration between the corrugated sheets 106, 108 and the planar members 102, 104 in which the upper edge 132 of the upper planar member 102 is aligned with the upper edges 120 of the corrugated sheets 106, 108, while the lower edge 136 of the other planar member 104 is aligned with the lower edges 122 of the corrugated sheets 106, 108. It is understood, however, that certain misalignment might be present, e.g., on the order of about 5 mm. Thus, it is sufficient that the respective upper or lower edges of the planar members be aligned at least near or proximal to the upper or lower edges of the corrugated sheets.

Structured packings with this preferred configuration may, however, be more difficult to manufacture than structured packings with other configurations, e.g., those in which only corrugated sheets are used without the planar members, or those using only one planar member sheet. Typically, the planar members 102 and 104 each have a height (designated as $h_T$ and $h_B$ respectively) equal to about one-fifth the height of the corrugated sheet ($h_C$). In the manufacturing process, planar members 102, 104 have to be individually aligned with the top and bottom edges 120, 122 of the corrugated sheets 106 and 108, before being held in position by some means. While this configuration operates satisfactorily, it adds significant cost to the manufacturing process and can also result in lower quality products if there is an unacceptably large misalignment between the corrugated sheets 106, 108 and the planar members 102, 104, either during fabrication or when the packing is in use.

The present invention provides a solution for these manufacturing and quality control problems. According to embodiments of the present invention, the planar members 102 and 104 are replaced by a single-piece planar structure that provides similar performance to the packing element 100 shown in FIG. 1. The use of a single-piece planar structure simplifies the alignment procedure between the planar and corrugated sheets, and results in reduced fabrication cost for the structured packing element. Although structured packings comprising a single planar member interposed between corrugation sheets have previously been disclosed, e.g., in U.S. Pat. Nos. 4,597,916 and 6,280,819, the planar members in these references have different designs compared to the present invention, and thus, are expected to result in different performance characteristics.

In the present invention, the upper and lower planar members 102, 104 are attached or connected to one another to create a single-piece planar member structure whose overall height is about the same as that of the corrugated sheets between which it will be placed. Alternatively, the single-piece planar member structure may also be formed as an integral structure from a planar sheet of material. The single-piece planar structure or planar member can be more easily aligned with and secured to the corrugated sheets than the two relatively short, separate planar members 102, 104.

Furthermore, for optimal functioning of the structured packing, the single-piece planar member is designed to approximate the hydraulic characteristics of the two separate top and bottom planar members 102, 104. While this can be accomplished with a myriad of specific designs, each workable design should have top and bottom portions with a relatively low open area and a middle portion with a relatively high open area. For purpose of this disclosure, it is useful to define the total open area of a selected portion of the single-piece planar member as compared to the total area of the same selected portion. As used herein, the term "open area percent" for any given portion of the planar member refers to the percentage of the total open area of the given portion relative to the total area of that portion. Furthermore, when a portion of the planar member is described as having a "relatively high open area", it means that the open area percent of that portion is at least about 20%, and preferably at least about 50%, but less than 100% of the total area of that portion; while "relatively low open area" means that the open area percent is in the range of about 0% to about 20% of the total area of that portion. The open area may be provided as apertures of different shapes and sizes, including elongated openings or slots, and may be arranged in random or regular fashion in different portions of the planar member structure.

Figure 2:
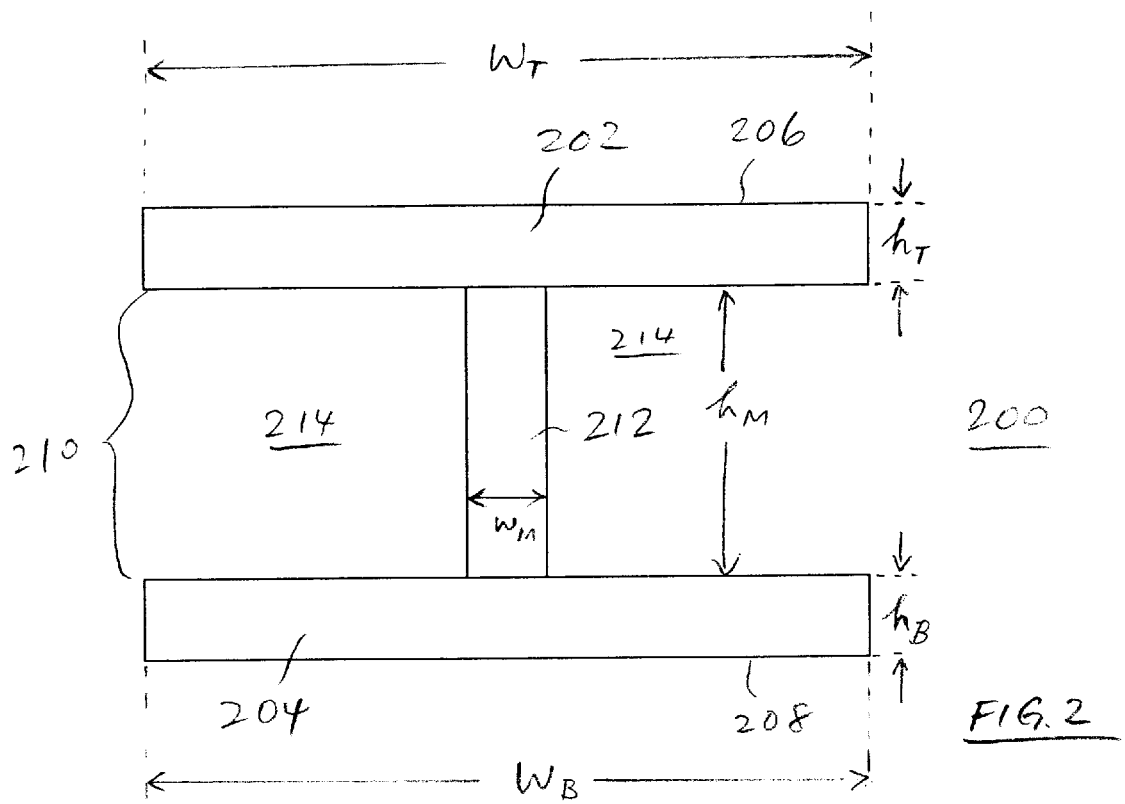
FIG. 2 is a schematic representation of a planar member that can be used in a structured packing element according to the present invention.

FIG. 2 is a schematic representation of one embodiment of the present invention, illustrating a planar member structure 200 with an I-shaped configuration. An upper planar member 202, or top portion, is attached or coupled to a lower planar member 204 or bottom portion by means of another planar member 212, which constitutes a part of a middle portion 210 of the planar member structure 200. The middle portion 210 includes the planar member 212 and any open area 214 between the top planar member 202 and the bottom planar member 204. The planar member 212 may be connected to the upper and lower planar members 202, 204 using any appropriate techniques, including welding, riveting, among others. Alternatively, the planar member structure 200 may also be fabricated as an integral piece from a sheet of suitable material.

The top, middle and bottom portions 202, 210 and 204 of the planar member structure 200 are each characterized by a height in a vertical direction, designated as $h_T$, $h_M$ and $h_B$, and a width in a horizontal direction, designated as $w_T$, $w_M$ and $W_B$, respectively. In one preferred embodiment, the sum of the heights $h_T$, $h_M$ and $h_B$ is about equal to the height of corrugated sheets used in fabricating a structured packing element. Optionally, the widths of the top and bottom planar members ($W_T$, $W_B$) may each be about equal to the width of the corrugated sheets. Due to the single-piece nature of the planar member structure 200, the outermost horizontal edges of the planar member structure 200—i.e., the top edge 206 of the upper planar member 202 and the bottom edge 208 of the lower planar member 204, can be more easily aligned with and secured to the corrugated sheets than the two separate planar members 102 and 104 illustrated in FIGS. 1a and 1b.

Although a solid, non-perforated planar member structure 200 is shown, a perforated embodiment can also be used. In the case of a perforated embodiment, upper and lower planar members 202, 204 should have open areas of less than about 20% of the respective top and bottom portions. The middle portion 210 can have higher open areas, e.g., the open area 214 between the top and bottom planar members 202, 204 is at least about 50% of the middle portion area, which is given, in this example, by the product of $h_M$ and the width of the corrugated sheet.

Figure 3:
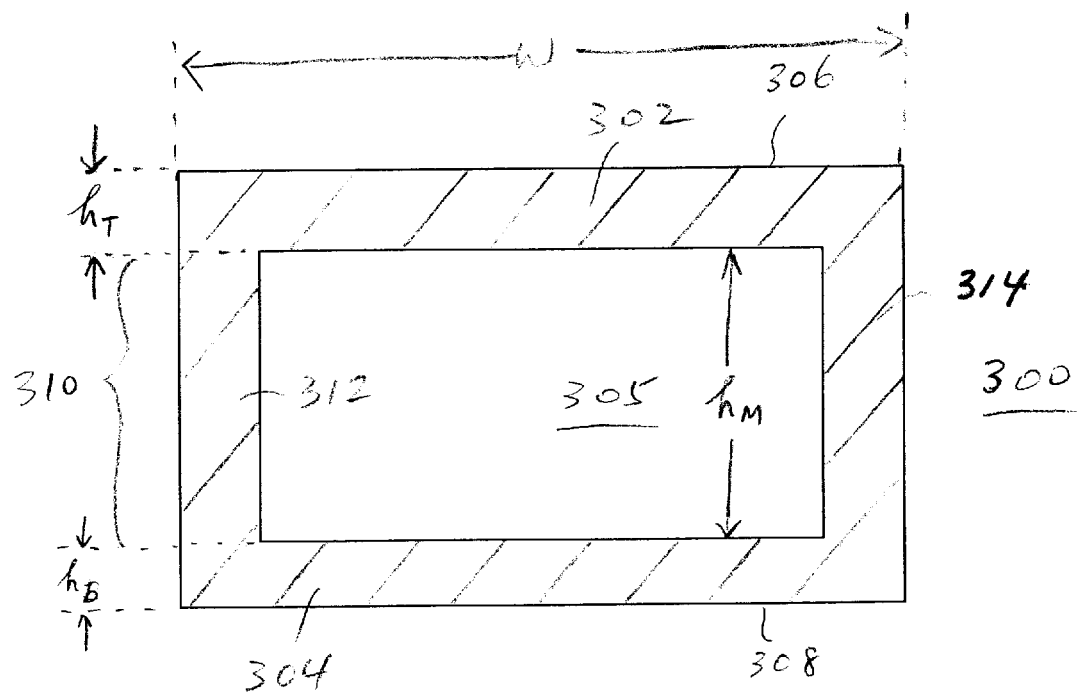
FIG. 3 is a schematic representation of another planar member that can be used in a structured packing element according to the present invention.

FIG. 3 is a schematic representation of another embodiment of the present invention. A planar member structure 300 comprises an upper planar member 302 coupled to a lower planar member 304 by means of an adjoining middle portion 310, which comprises two planar sections 312 and 314 and an open area 305 lying between the upper and lower planar members. Each of the upper and lower planar members 302, 304 can be solid (i.e., non-perforated) or perforated with an open area percent of up to about 20% of the respective areas of the upper and lower planar members 302, 304. Planar sections 312 and 314 can also be solid or perforated with an open area of at least about 50% of the middle portion area. In a preferred embodiment, the middle portion area is given by a product of the height ($h_M$) and the width (w) of the planar sheet, with the width of the planar sheet being also approximately equal that of the adjacent corrugated sheets. The planar structure 300 may be fabricated as an integral structure, for example, by stamping out an open area 305 from a sheet of suitable material. Alternatively, the planar structure 300 may also be fabricated by attaching individual planar members such as sections 312 and 314 to the upper and lower planar portions 302 and 304, or other variations thereof.

Figure 4:
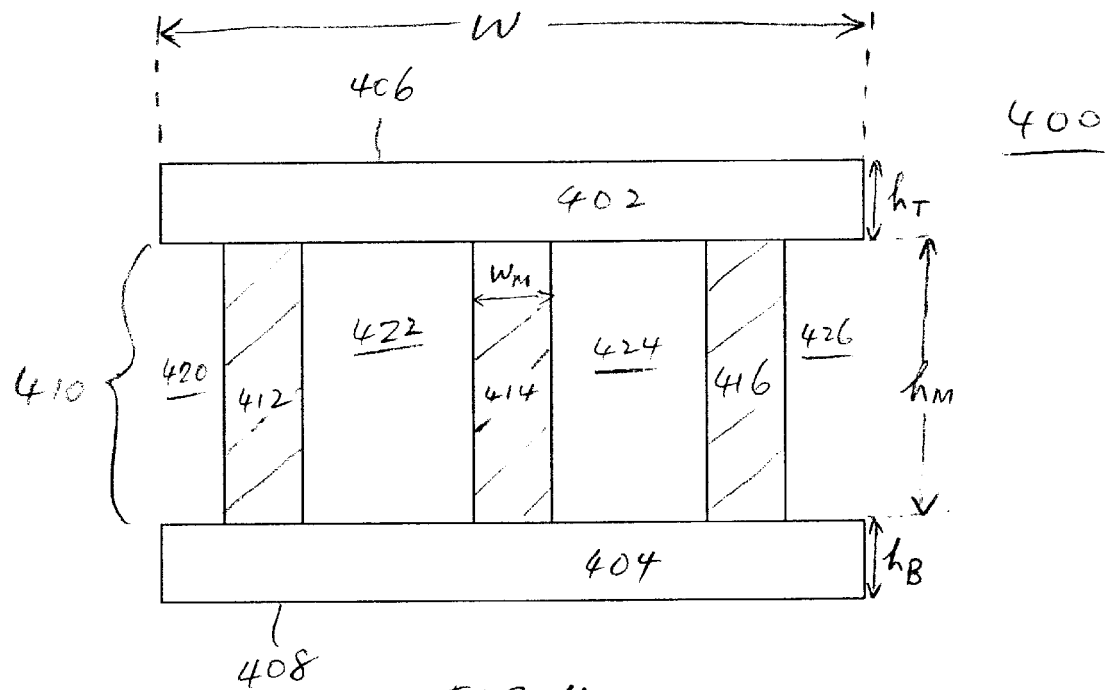
FIG. 4 is a schematic representation of another planar member that can be used in a structured packing element according to the present invention.

FIG. 4 shows another embodiment in which a planar member structure 400 has a middle portion 410 comprising more than two planar member sections and open areas. For example, planar member sections 412, 414 and 416, each characterized by a height $h_M$ and width $w_M$, are used to couple the top and bottom planar members 402 and 404 to each other. When the planar member structure 400 is used to form a structured packing element of the present invention, its outermost horizontal edges, i.e., the top and bottom edges 406, 408 are proximally aligned with corresponding top and bottom edges of adjacent corrugated sheets. The open areas 420, 422, 424 and 426 of the middle portion 410 and any perforations that may be present on the planar sections 412, 414 and 416 preferably have a total area that is at least about 50% of the middle portion area (given by a product of w and $h_M$). Again, the planar member structure 400 may also be fabricated as an integral structure from a sheet of suitable material, instead of joining individual planar member sections together with fastening or attaching means. Alternatively, one or more of the top, middle or bottom portions 402, 404 or 410 may be provided with perforations.

Figure 5:
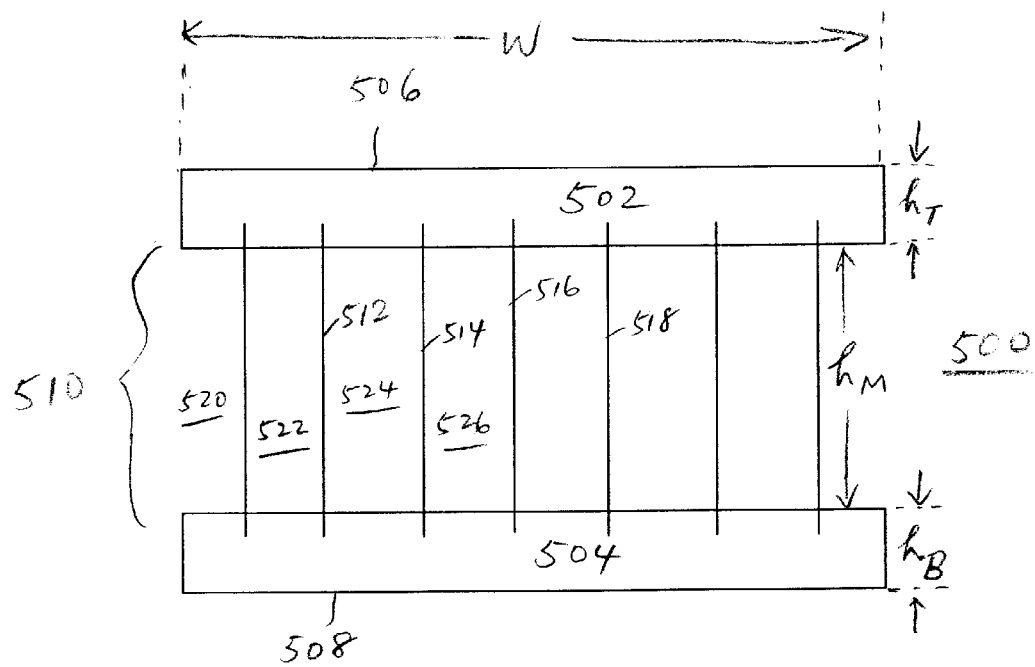
FIG. 5 is a schematic representation of yet another planar member that can be used in a structured packing element according to the present invention.

FIG. 5 is a schematic view of another embodiment of the present invention. In this planar member structure 500, the middle portion 510, which has a height $h_M$, comprises at least two or a plurality of rods or wires 512, 514, 516, 518, etc., or other similar or functionally equivalent attachment means known to one skilled in the art that can be used for coupling the top portion 502 to the bottom portion 504. In this embodiment, the open areas 520, 522, 524, 526 etc. constitute a large percent of the middle portion area given generally by the product of w and $h_M$.

In this and other embodiments, it is understood that the connecting rods or wires, or other planar member sections used for coupling or attaching the top and bottom portions together, may have heights that are different from the actual height $h_M$ of the middle portion 510 (e.g., due to different means used for such coupling or attachment). If it is desired to have both the top and bottom outermost edges 506, 508 proximally aligned with respect to the top and bottom edges respectively of the corrugated sheets, then the overall height of the resulting planar member structure 500 is preferably approximately equal to the height of the corrugated sheets used in fabricating the structured packing element.

Furthermore, it is understood that the middle portion of the planar member structure may generally comprise different numbers of planar member sections of varying widths and in various spatial arrangements and combinations; and those shown in FIGS. 2–5 are meant to serve mainly as illustrative examples.

Figure 6A:
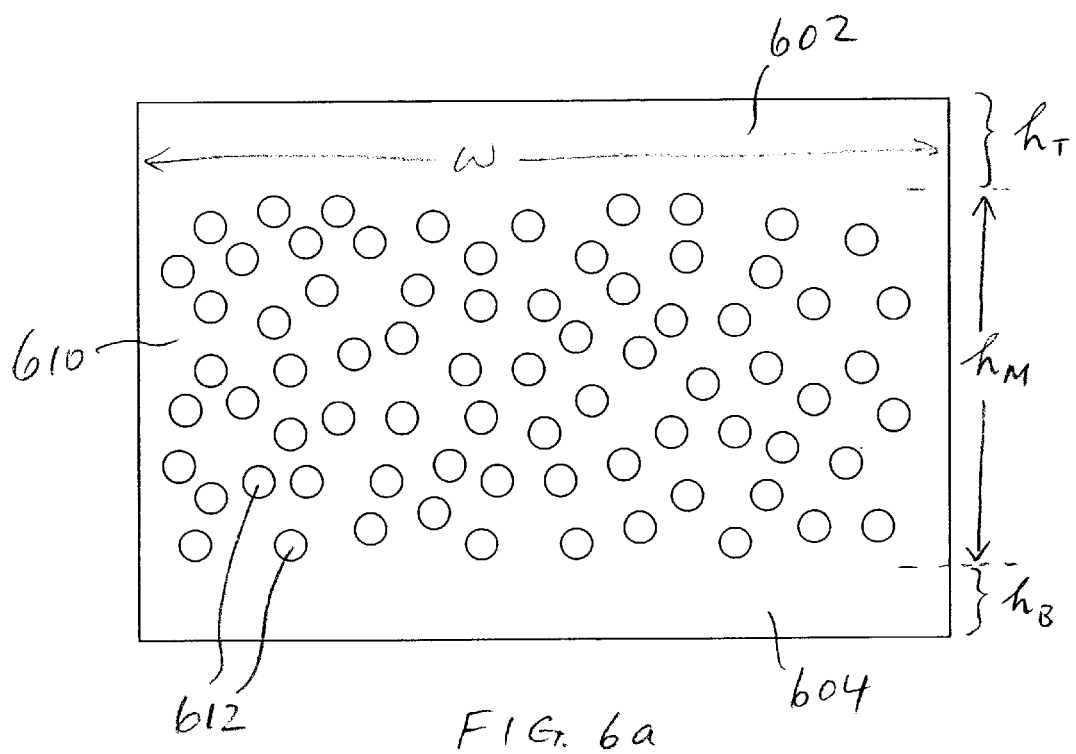
FIGS. 6a–d are schematic representations of additional planar members that can be used in a structured packing element according to the present invention.
Figure 6B:
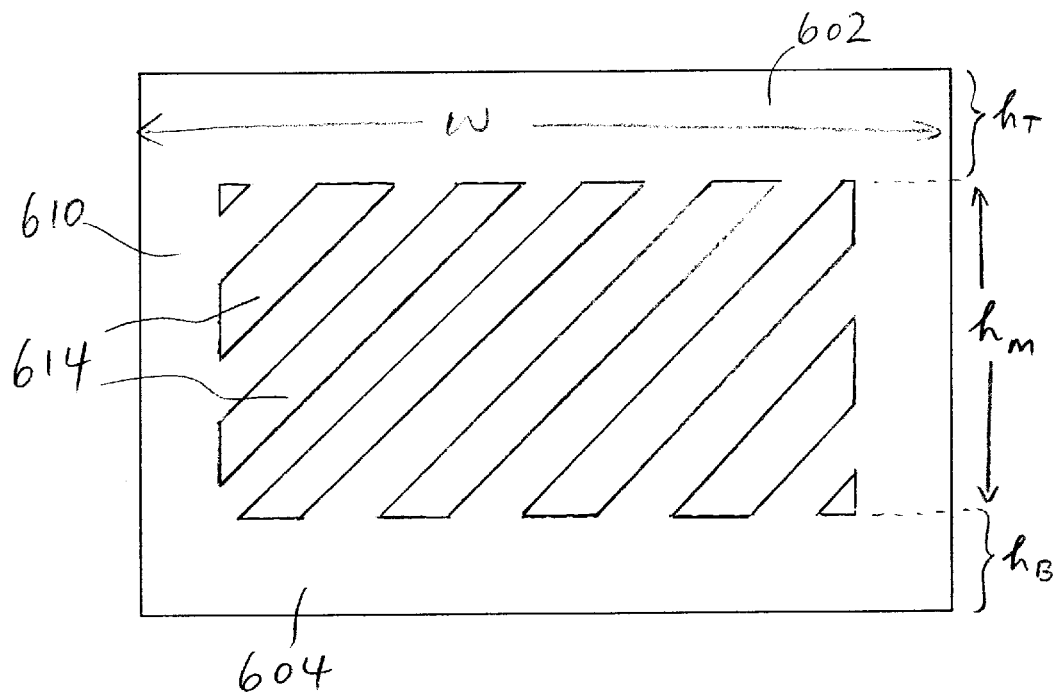
Figure 6C:
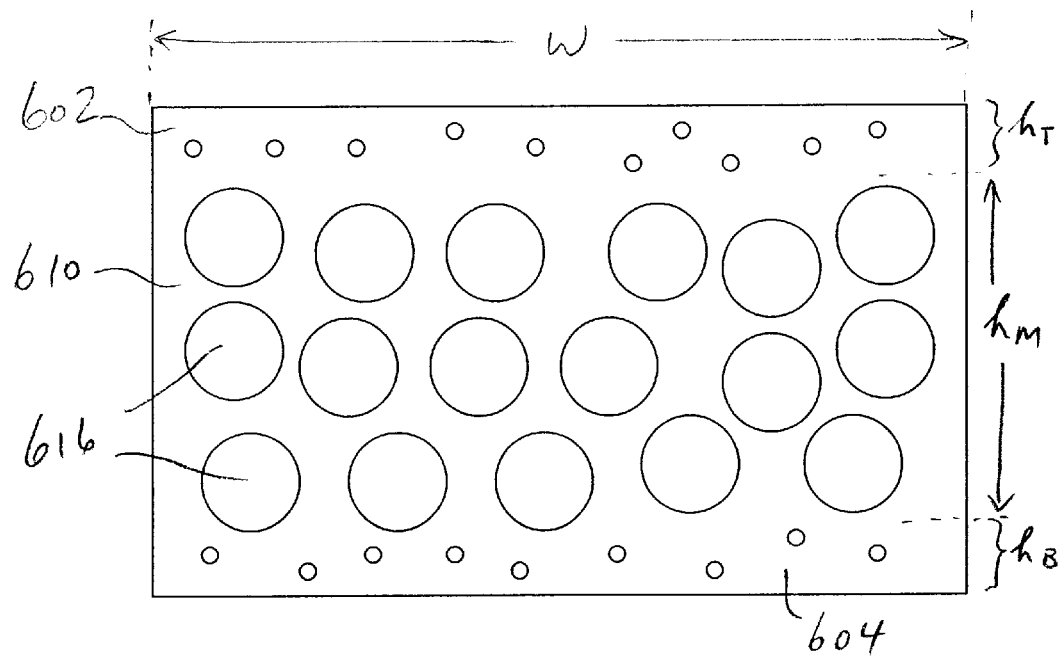
Figure 6D:
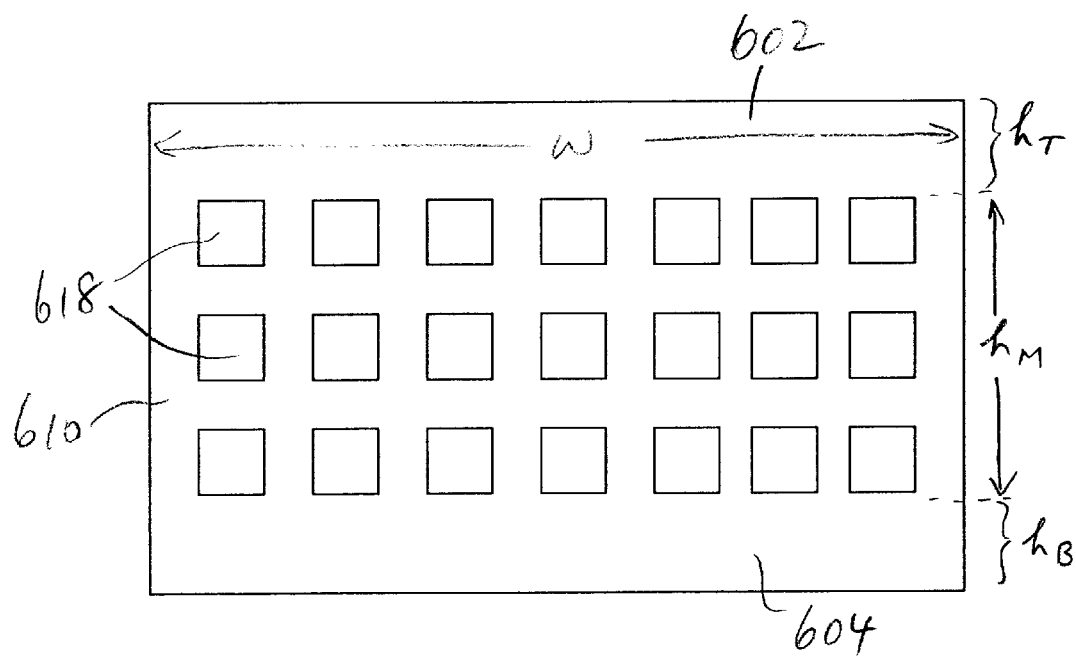

FIGS. 6a, 6b, 6c and 6d are schematic illustrations of still other alternative embodiments. In each of these embodiments, the planar member structure may have a solid or perforated upper planar portion 602 with a small open area, a middle planar portion 610 with a relatively large open area, and a solid or perforated lower planar portion 604 with a small open area. The large open area of the middle planar portion 610 may, for example, comprise a plurality of small size perforations 612 (circular or otherwise) such as illustrated in FIG. 6a; a plurality of elongated openings or slots 614 such as shown in FIG. 6b; a plurality of large size perforations 616 such as shown in FIG. 6c; a plurality of non-circular perforations 618 such as shown in FIG. 6d; or any combinations thereof.

Furthermore, the plurality of perforations or openings may be arranged in random or regular fashion within any of the top, middle or bottom portions 602, 610 and 604 of the planar member structure. These embodiments can be readily fabricated as a single-piece structure out of a sheet of suitable material using conventional techniques to form the various openings of different sizes and shapes. It is understood that these examples are meant for illustrative purpose, and that many other variations of opening dimensions, shapes and combinations thereof, are also acceptable, as would be determined by one skilled in the art.

In the embodiments of FIGS. 6a–d, the middle planar portion 610 should have an open area percent of at least about 20%, preferably at least about 50% of the middle portion area, which is given by the product of w and $h_M$, while the upper and lower planar portions preferably should each have open area percentages of not greater than about 20% of the respective areas of the upper and lower portions.

In addition, in each of the above embodiments of FIGS. 2–6, the heights ($h_T$ and $h_B$) of the top and bottom portions of the planar member structure are preferably at least about twice the width of the corrugations (CW) as measured between successive peaks along the perpendicular to the longitudinal axis of the corrugations, and no more than about one-third the height of the corrugated sheet. Preferably, the respective heights of the top and bottom portions of the planar member structure are between about five times the corrugation width and one-fifth the height of the corrugated sheet. Furthermore, although it is preferred that the widths of the planar members (e.g., widths of the various portions) be approximately equal to the widths of adjacent corrugated sheets, it is understood that certain deviations or variations are acceptable for practicing the present invention. However, if the widths of the top and bottom portions are significantly less than those of adjacent corrugated sheets, there may be a reduction in performance advantages expected from these structured packings.

It is understood that each of the planar structures disclosed herein may be used in conjunction with many corrugated sheets of varying designs to form structured packing elements for use in a variety of distillation applications, including but not limited to, air separation. The corrugated sheets may have different designs or configurations, including for example, angles of inclination that are constant within each corrugated sheet, or angles that vary within different portions of the corrugated sheet, among others known to one skilled in the art. Furthermore, the choice of perforation designs (e.g., number, size or shape of perforations), the alignment of planar and corrugated sheets, or fabrication of these structured packing elements, can be done using techniques known to one skilled in the art.

Although it is preferable that a structured packing element be formed by having a planar member structure adjacent to each of the corrugated sheets, it is understood that a certain number of planar members may be omitted between corrugated sheets without detracting from the scope of the invention. For example, it is expected that a packing element having a planar member positioned adjacent to a majority of the corrugated sheets is sufficient to provide improved performance characteristics compared to packing elements without these planar members.

Structured packing elements comprising the single-piece planar structures of this invention can lead to reduced fabrication costs and improved quality control for the resulting structured packings (e.g., formed by stacking structured packing elements vertically with respect to each other using techniques known in the art) compared with similar packing elements made from two-piece planar members. Such structured packings can be used to provide improved methods of distillation, e.g., in cryogenic air separation.

Several embodiments of the present invention are shown in the accompanying drawings. While the present invention has been described with reference to these embodiments, as will occur to those skilled in the art, numerous changes, additions and omissions may be made without departing from the spirit and scope of the present invention.

What is claimed is:

1. A structured packing element comprising:
   a plurality of perforated corrugated sheets each having a top edge and a bottom edge and corrugations characterized by a corrugation width;
   a planar member positioned adjacent to each said plurality of corrugated sheets;
   wherein said planar member comprises a top portion, a bottom portion and a middle portion, said top and bottom portions each having an open percent that is less than an open area percent of said middle portion, said top and bottom portions each having outermost edges that are at least proximally aligned with said top and bottom edges respectively of said perforated corrugated sheets.

2. The structured packing element of claim 1, wherein said open area percents of said top portion and said bottom portion are each less than about 20%.

3. The structured packing element of claim 1, wherein said open area percent of said middle portion is at least about 50% and less than 100%.

4. The structured packing element of claim 1, wherein said majority of said perforated corrugated sheets are substantially rectangular in shape and each is characterized by a height in a vertical direction and a width in a horizontal direction, said top and said bottom portions are substantially rectangular in shape and each has a width about equal to said width of said perforated corrugated sheet.

5. The structured packing element of claim 4, wherein said top and bottom portions are each characterized by a height in a vertical direction that is at least about twice the corrugation width but not greater than about one-third of said height of said perforated corrugated sheets.

6. The structured packing element of claim 4, wherein said top and bottom portions are each characterized by a height that is at least about five times the corrugation width but not greater than about one-fifth of said height of said perforated corrugated sheets.

7. The structured packing element of claim 1, wherein said middle portion comprises at least one substantially rectangular shaped section.

8. The structured packing element of claim 7, wherein said open area of said middle portion comprises a plurality of openings.

9. The structured packing element of claim 1, wherein said middle portion comprises at least two connecting members selected from the group consisting of rods, wires, planar member sections, and combinations thereof.

10. The structured packing element of claim 1, wherein said perforated corrugated sheets have corrugations characterized by angles of inclination that vary within each of said perforated corrugated sheet.

11. A structured packing element comprising:
    a plurality of perforated corrugated sheets each having a top edge, a bottom edge, a height in a vertical direction, and corrugations characterized by a corrugation width;

a planar member positioned adjacent to each of said plurality of perforated corrugated sheets;

wherein said planar member comprises a top portion, a bottom portion and a middle portion, said top and bottom portions each having an open area percent less than about 20% and said middle portion having an open area percent at least about 50% and less than 100%, said top and bottom portions having outermost horizontal edges that are at least proximally aligned with said top and bottom edges respectively of said perforated corrugated sheets, and said top and bottom portions each has a height in a vertical direction that is at least about twice the corrugation width but not greater than about one-third of said height of said perforated corrugated sheets.

12. A structured packing for use in a distillation column, said structured packing comprising a plurality of structured packing elements, each of which comprises:

a plurality of perforated corrugated sheets each having a height in a vertical direction, a top edge, a bottom edge and corrugations each characterized by a corrugation width;

a planar member positioned adjacent to each of said plurality of corrugated sheets;

wherein said planar member comprises a top portion, a bottom portion and a middle portion, said top and bottom portions each having an open area percent that is less than an open area percent of said middle portion, said top and bottom portions having outermost edges that are at least proximally aligned with said top and bottom edges respectively of said perforated corrugated sheets.

13. The structured packing of claim 12, wherein said top and bottom portions of said planar member each have an open area percent that is less than about 20%, and said middle portion has an open area percent that is at least about 50% and less than 100%.

14. The structured packing of claim 12, wherein said top and bottom portions of said planar member are each characterized by a height in a vertical direction that is at least about twice said corrugation width of said corrugations but not greater than about one-third of said height of said perforated corrugated sheets.

15. A method of cryogenically separating a fluid mixture within a distillation column operating at cryogenic temperatures, comprising:

forming descending liquid and ascending gaseous phases of said fluid mixture within said distillation column;

contacting said descending liquid and ascending gaseous phases of said fluid mixture within a structured packing contained within at least one section of said distillation column;

said structured packing comprising a series of structured packing elements;

wherein each of said structured packing elements comprises:

a plurality of perforated corrugated sheets each having a height in a vertical direction, a top edge, a bottom edge and corrugations characterized by a corrugation width;

a planar member positioned adjacent each of said plurality of corrugated sheets, said planar member comprises a top portion, a bottom portion and a middle portion, said top and bottom portions each having an open area percent that is less than an open area percent of said middle portion, and said top and bottom portions having outermost edges that are at least proximally aligned with said top and bottom edges of said perforated corrugated sheets.

16. The method of claim 15, wherein said open area percents of said top and bottom portions of said planar member are each less than about 20%.

17. The method of claim 15, wherein said open area percent of said middle portion of said planar member is in a range of about 50% to less than 100%.

18. The method of claim 15, wherein said top and bottom portions of said planar member each has a height in a vertical direction that is at least about twice said corrugation width but not greater than about one-third of said height of said perforated corrugated sheets.

19. The method of claim 15, wherein said fluid mixture comprises air, and said descending liquid phase becomes more concentrated in oxygen and said ascending gaseous phase becomes more concentrated in nitrogen.

* * * * *